(12) United States Patent
Samukawa et al.

(10) Patent No.: US 8,214,087 B2
(45) Date of Patent: Jul. 3, 2012

(54) OBJECT SPECIFYING DEVICE FOR A VEHICLE

(75) Inventors: Yoshie Samukawa, Kariya (JP); Toyohito Nozawa, Aichi-ken (JP)

(73) Assignee: Denso Corporation, Kariya (JP)

( * ) Notice: Subject to any disclaimer, the term of this patent is extended or adjusted under 35 U.S.C. 154(b) by 280 days.

(21) Appl. No.: 12/798,920

(22) Filed: Apr. 14, 2010

(65) Prior Publication Data
US 2011/0010020 A1    Jan. 13, 2011

(30) Foreign Application Priority Data
Jul. 9, 2009  (JP) .................. 2009-162774

(51) Int. Cl.
*G05D 1/00*    (2006.01)
*G06F 17/00*    (2006.01)

(52) U.S. Cl. .............. 701/1; 701/41; 340/425.5

(58) Field of Classification Search ............... None
See application file for complete search history.

(56) References Cited

U.S. PATENT DOCUMENTS 7,289,017 B2 * 10/2007 Sawamoto et al. ........ 340/425.5
2006/0149452 A1    7/2006 Sawamoto et al.

FOREIGN PATENT DOCUMENTS

| JP | 08-216726 | 8/1996 |
|---|---|---|
| JP | 2006-127194 | 5/2006 |
| JP | 2008-040646 | 2/2008 |

* cited by examiner

*Primary Examiner* — Luna Champagne
(74) *Attorney, Agent, or Firm* — Harness, Dickey & Pierce, PLC

(57) ABSTRACT

An object specifying device mounted in a controlled vehicle has a unit for tracking objects, existing in a monitoring area set along a running direction of the controlled vehicle, to detect the objects as forward objects, a unit for specifying one forward object running in the area as a forward vehicle, a unit for specifying each of other forward objects as a candidate for a control-based object when the forward object is placed in an inter-vehicle area between the controlled and forward vehicles, and a unit for specifying each candidate, tracked for a tracking period equal to or longer than a reference tracking period, as a control-based object and specifies each candidate, tracked for a tracking period shorter than the reference tracking period, as a non-control-based object. The controlled vehicle is controlled according to a movement of the control-based objects, regardless of a movement of the non-control-based objects.

5 Claims, 5 Drawing Sheets

OBJECT SPECIFYING DEVICE FOR A VEHICLE

CROSS-REFERENCE TO RELATED APPLICATION

This application is based upon and claims the benefit of priority of the prior Japanese Patent Application 2009-162774 filed on Jul. 9, 2009, so that the contents of which are incorporated herein by reference.

BACKGROUND OF THE INVENTION

1. Field of the Invention

The present invention relates to an object specifying device which specifies each of a plurality of objects existing in the forward area of a controlled vehicle as a control-based object when the vehicle should be controlled on the basis of the movement of the object and specifies each of the objects as an unnecessary object when it is not required to control the vehicle on the basis of the movement of the object. The present invention also relates to a vehicle control apparatus which controls the vehicle on the basis of movements of the control-based objects specified by the device while disregarding movements of the unnecessary objects specified by the device.

2. Description of Related Art

It is known that an object specifying device mounted in a controlled vehicle is used to prevent the controlled vehicle from colliding with an object or to control an inter-vehicle distance between the controlled vehicle and a forward vehicle, running in the forward area of the controlled vehicle, for the purpose of automatically running the controlled vehicle. This device specifies an object placed at the forward area of the controlled vehicle as a control-based object when the controlled vehicle should be controlled on the basis of the specified object.

Japanese Patent Specification No. 4210640, for example, discloses this device. In this Specification, the device mounted in the controlled vehicle detects a plurality of objects existing in the forward area of the controlled vehicle. Then, a judging area placed around the first detected object is set. When the second detected object has passed through this judging area, one of the first and second detected objects which has the lower speed or approaches the controlled vehicle is specified as an unnecessary object. That is, when the controlled vehicle is controlled according to movements of control-based objects, the device excludes the object specified as the unnecessary object from the group of control-based objects.

In this technique, for example, when the forward vehicle denoting one object has passed over a manhole, the device detects that the manhole denoting another object has passed through the judging area set around the forward vehicle. Then, the device specifies the manhole having the speed lower than the forward vehicle or approaching the controlled vehicle as an unnecessary object. Therefore, the device can exclude the manhole from the group of control-based objects.

However, during the running of the controlled vehicle and the forward vehicle on a straight road, the forward vehicle obstructs the view of a manhole placed on the road. Therefore, the device cannot detect the manhole until the forward vehicle passes through on or over the manhole. That is, there is a high probability that the device cannot detect the manhole until the manhole passes through the judging area of the forward vehicle. In this case, the device cannot detect that the manhole has passed through the judging area of the forward vehicle. As a result, there is a high probability that the device cannot specify the manhole as an unnecessary object.

SUMMARY OF THE INVENTION

An object of the present invention is to provide, with due consideration to the drawbacks of the conventional object specifies device, an object specifying device of a controlled vehicle that reliably specifies an object, of which the view can be obstructed by a forward vehicle running at the forward area of the controlled vehicle, as a non-control-based object so as not to control the controlled vehicle on the basis of a movement of the non-control-based object.

Further, the object of the present invention is to provide a vehicle control apparatus which controls the controlled vehicle on the basis of a movement of a control-based object specified by the device, regardless of a movement of a non-control-based object specified by the device.

According to the first aspect of this invention, the object is achieved by the provision of an object specifying device of a controlled vehicle, comprising an object tracking unit, a forward vehicle specifying unit, a candidate specifying unit and an object specifying unit. The object tracking unit tracks each of a plurality of objects, existing in a monitoring area set along a running direction of the controlled vehicle, to detect the object as a forward object. The forward vehicle specifying unit that specifies one of the forward objects as a forward vehicle when the forward object is moving. The candidate specifying unit specifies each of the forward objects other than the forward vehicle as a candidate for a control-based object when the forward object is placed in an inter-vehicle area between the controlled vehicle and the forward vehicle. The object specifying unit that specifies one of the candidates specified by the candidate specifying unit as a control-based object when the object tracking unit tracks the candidate for a tracking period of time equal to or longer than a reference tracking period of time and specifies another one of the candidates as a non-control-based object when the object tracking unit tracks the candidate for a tracking period of time shorter than the reference tracking period of time. The controlled vehicle is controlled according to a movement of the control-based object tracked by the object tracking unit, regardless of a movement of the non-control-based object.

With this configuration of the object specifying device, when the object tracking unit tracks the candidate for a tracking period of time equal to or longer than the reference tracking period of time, the object specifying unit judges that the candidate is detected by the object tracking unit before the candidate is placed in the inter-vehicle area and judges that there is a probability that the controlled vehicle will collide with the candidate. Therefore, the object specifying unit specifies the candidate as a control-based object. The controlled vehicle is controlled according to the movement of the control-based object.

In contrast, when the object tracking unit tracks the candidate for a tracking period of time shorter than the reference tracking period of time, the object specifying unit judges that the candidate, of which the view is obstructed by the forward vehicle, is suddenly detected by the object tracking unit when the candidate is placed in the inter-vehicle area. Therefore, the object specifying unit judges that, because the forward vehicle passes through on or over the candidate without colliding with the candidate, there is no possibility that the controlled vehicle will collide with the candidate. Therefore, the object specifying unit specifies the candidate as a non-control-based object. The controlled vehicle is controlled regardless of the movement of the non-control-based object.

Accordingly, the object specifying device can reliably specify an object, of which the view can be obstructed by the forward vehicle, as a non-control-based object so as not to control the controlled vehicle on the basis of the movement of the non-control-based object.

According to the second aspect of this invention, the object is achieved by the provision of a vehicle control apparatus of a controlled vehicle, comprising the object specifying device and a vehicle control unit. The vehicle control unit controls the controlled vehicle according to a movement of the control-based object specified by the object specifying device, regardless of a movement of the non-control-based object specified by the object specifying device.

Accordingly, the vehicle control apparatus can control the controlled vehicle on the basis of the control-based object, regardless of the movement of the non-control-based object.

DETAILED DESCRIPTION OF THE PREFERRED EMBODIMENT

An embodiment of the present invention will now be described with reference to the accompanying drawings.

Embodiment

Figure 1:
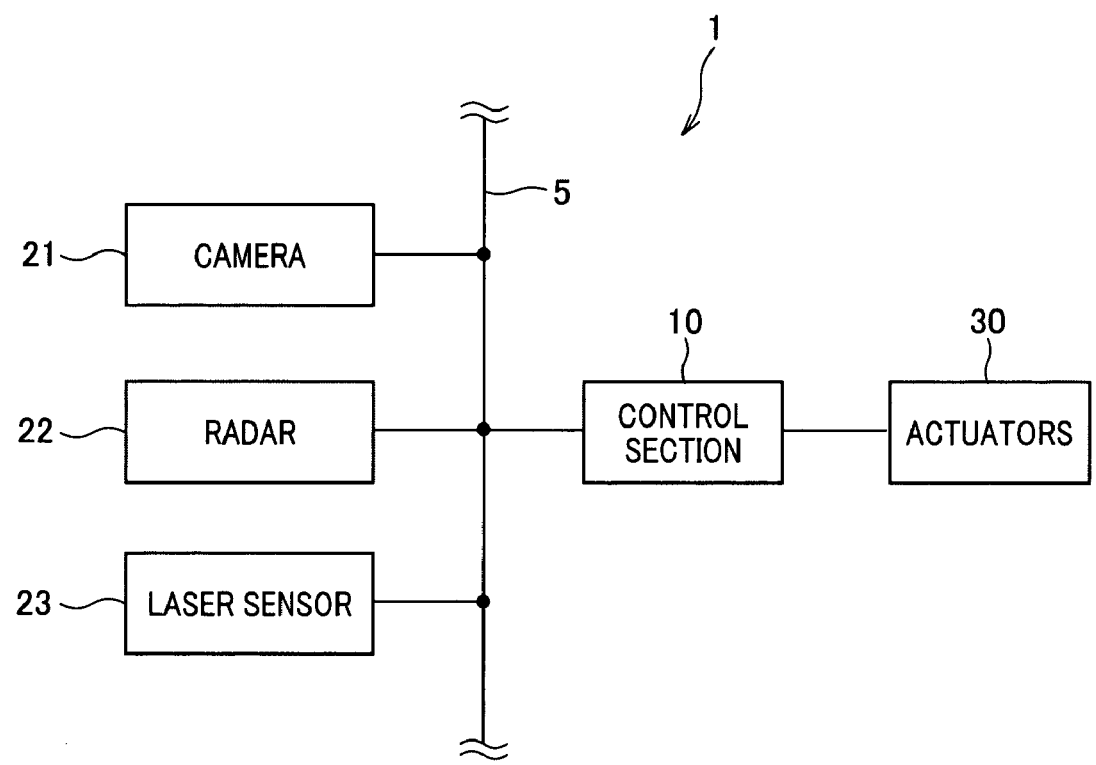
FIG. 1 is a block diagram of a vehicle control system according to the embodiment of the present invention.

FIG. 1 is a block diagram of a vehicle control system according to the embodiment. A vehicle control system 1 is mounted in a vehicle (hereinafter, called a controlled vehicle) such as a passenger car or the like. As shown in FIG. 1, the system 1 has a camera 21, a radar 22, a laser sensor 23 and a control section 10 connected with one another through a communication line 5. The control section 10 acts as an object specifying device. The system 1 further has a plurality of actuators 30 acting as a vehicle control unit.

The camera 21 takes a photograph of a monitoring area set along the running direction of the vehicle and transmits the photographed picture to the control section 10. The radar 22 is formed of a well-known millimeter wave radar. This radar 22 radiates a beam of electromagnetic wave such as electric wave, light wave or the like set in the millimeter wave band to the monitoring area. This beam is reflected by each of a plurality of objects existing in the monitoring area. The laser sensor 23 receives a beam of wave reflected by each object and detects a position and a speed of the object relative to the controlled vehicle and a shape of the object. The sensor 23 transmits information such as the position, speed and shape of each object to the control section 10.

The control section 10 is formed of a well-known microcomputer having a central processing unit (CPU), a read only memory (ROM), a random access memory (RAM) and the like. The CPU executes various processes by using software programs stored in the ROM and data stored in the RAM.

Then, the control section 10 operates the actuators 30 according to results obtained in the CPU. In response to the operation of the actuators 30, a brake, a steering wheel, a seat belt winding motor and the like are driven to drive the controlled vehicle under control of the control system 1.

Figure 2:
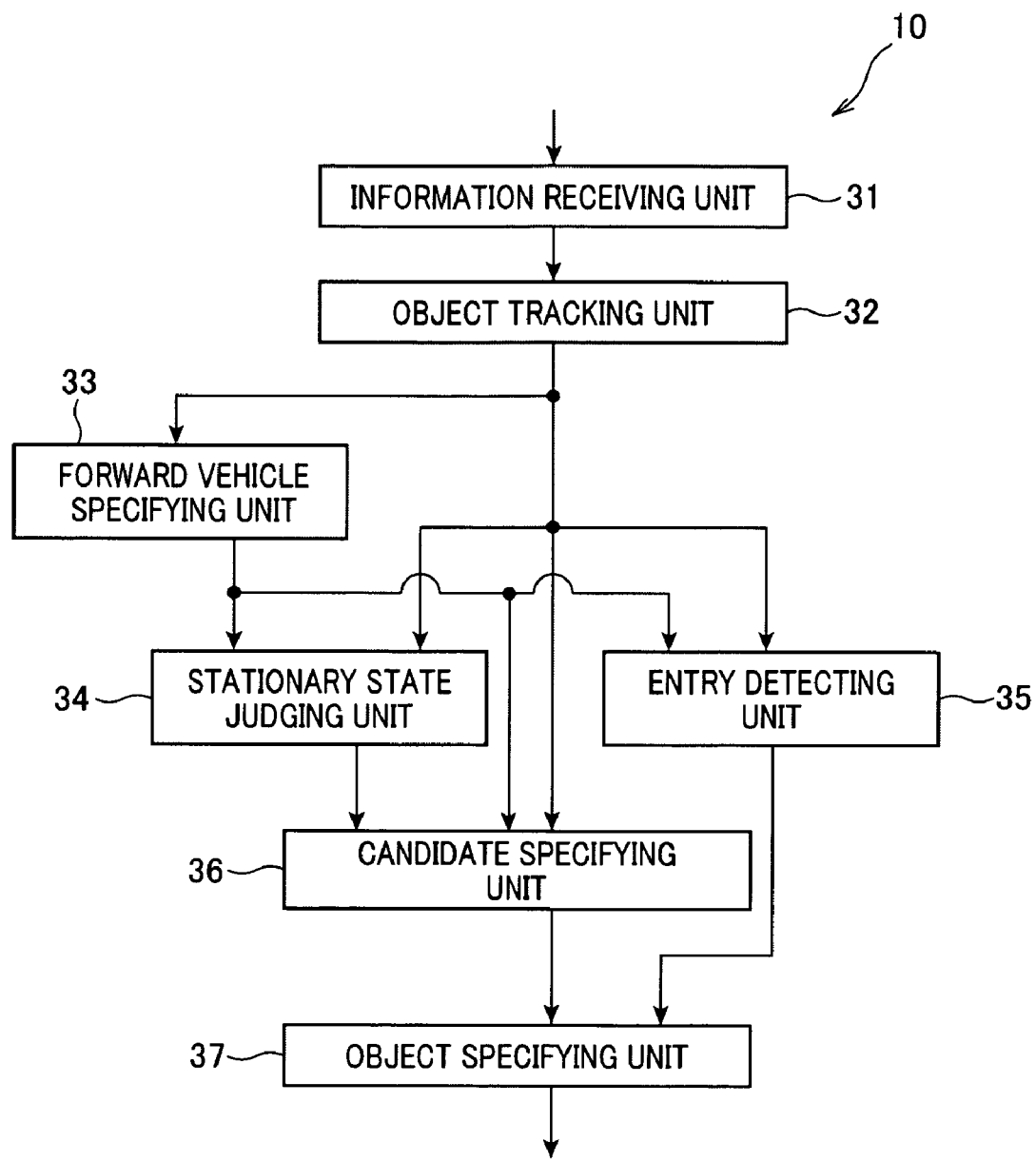
FIG. 2 is a block diagram of a control section of the control system shown in FIG. 1.

FIG. 2 is a block diagram of the control section 10. As shown in FIG. 2, to operate the actuators 30, the control section 10 acting as an object specifying device has an information receiving unit 31, an object tracking unit 32, a forward vehicle specifying unit 33, a stationary state judging unit 34, an entry detecting unit 35, a candidate specifying unit 36, and an object specifying unit 37. These units are operated every control period of time. Further, the control section 10 sets the monitoring area along the forward direction (i.e., the running direction) of the controlled vehicle. The control section 10 can detect an object or a plurality of objects existing in the monitoring area by analyzing information on the objects sent from the sensor 23 and/or analyzing the photographed picture of the camera 21.

The receiving unit 31 receives information (e.g., position and speed relative to the controlled vehicle and a shape) on each of a plurality of objects, existing in the monitoring area, from the camera 21 and the sensor 23 and receives information on the running speed of the controlled vehicle from a speed sensor (not shown).

The object tracking unit 32 tries to track each object indicated by the received information and detects the object as a forward object when the unit 32 can successively track the object during a period of time including the present control period and one or more preceding periods. In this tracking, the tracking unit 32 detects a movement of the object. This movement is indicated by the relative position and speed of the object.

The forward vehicle specifying unit 33 specifies one of the forward objects as a forward vehicle when the forward object is moving in the monitoring area. More specifically, when one of the forward objects satisfies conditions necessary for a forward vehicle, the forward object is specified as a forward vehicle. For example, these conditions contain a condition that the forward object is moving on the same traffic lane as that of the controlled vehicle at a probability equal to or higher than 50%, a condition that the inter-vehicle distance between the controlled vehicle and the forward object is ranged from 10 m to 100 m, a condition that the forward object is now moving at a speed equal to or higher than a judging speed such as 2 km/hr, and a condition that the forward object has been already specified as one control-based object in the preceding control period.

The stationary state judging unit 34 judges, from a movement of each forward object different from the forward vehicle, whether or not the forward object is in a stationary state.

The entry detecting unit 35 specifies one of the forward objects which is different from the forward vehicle, is placed on the same running lane as that of the controlled vehicle and is placed out of an inter-vehicle area between the controlled vehicle and the forward vehicle. The detecting unit 35 detects an entry of the specified forward object into the inter-vehicle area according to the movement of the forward object detected by the object tracking unit 32.

The candidate specifying unit 36 specifies each of the forward objects other than the forward vehicle as a candidate for a control-based object on condition that the forward object is placed in the inter-vehicle area and the stationary state judging unit 34 judges the forward object to be in a stationary state.

The object specifying unit 37 specifies each candidate as a control-based object when the object tracking unit 32 tracks the candidate for a tracking period of time equal to or longer than a reference tracking period of time, extracts information on the control-based object from information on the forward objects and stores the extracted information in a memory such as RAM. Further, the specifying unit 37 specifies each candidate as an unnecessary object (i.e., a non-control-based object) when the object tracking unit 32 tracks the candidate for a tracking period of time shorter than the reference tracking period of time, extracts information on the non-control-based object from information on the forward objects and abandons the extracted information.

When the entry detecting unit 35 detects the entry of one forward object into the inter-vehicle area, the object specifying unit 37 specifies the forward object, which is specified as the candidate by the candidate specifying unit 36, as the unnecessary object even when the object tracking unit 32 tracks the forward object for a tracking period of time equal to or longer than the reference tracking period of time.

When the object specifying unit 37 once specifies the candidate as the unnecessary object, the object specifying unit 37 keeps this specification of the candidate as the unnecessary object.

The actuators 30 acting as a vehicle control unit controls the controlled vehicle according to the movement of the control-based object tracked by the object tracking unit 32, regardless of the unnecessary object.

With this configuration of the control section 10, the control section 10 performs an object specifying process to detect a plurality of objects, existing in the monitoring area of the system 1, from data obtained in the sensor 23 or the camera 21. This process is performed every control period of time. For example, this process is periodically executed at intervals of 50 ms or 100 ms.

Figure 3:
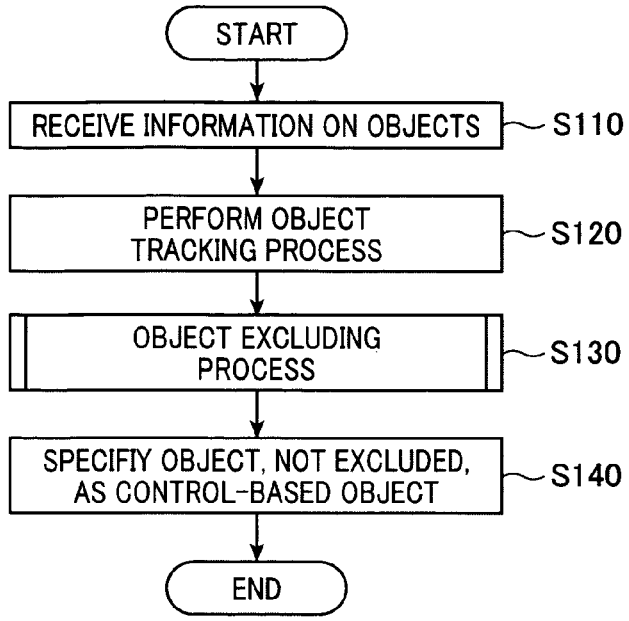
FIG. 3 is a flow chart showing an object specifying process performed in the control section.

This object specifying process will be described with reference to FIG. 3. FIG. 3 is a flowchart showing an object specifying process performed in the control section 10.

The object specifying process is started when an ignition switch of the controlled vehicle is turned on to supply electric power to the control system 1. When this process is started in the present control period, all flags used for the process are preset at off states, and all counters used for the process are cleared at zero.

As shown in FIG. 3, at step S110, the receiving unit 31 of the control section 10 receives information on a plurality of objects existing in the monitoring area from the camera 21 and/or the sensor 23. Further, the control section 10 receives information on the running speed of the controlled vehicle from a vehicle speed sensor (not shown). To pick up objects from photographed pictures of the camera 21, pattern matching or the like is performed for the photographed pictures, and information on the objects is obtained in the control section 10.

Thereafter, at step S120, the tracking unit 32 of the control unit 10 performs an object tracking process to detect the objects, placed in the monitoring area, as forward objects. In this tracking process, the tracking unit 32 tracks each object while referring to information on the object obtained at the present control time and information on the object obtained at the preceding control periods. When the object is successfully tracked for a predetermined period of time, the tracking unit 32 judges that the object is detected as a forward object. Each time information on the forward object is obtained at the present time, the information is stored in a memory such as RAM.

Thereafter, at step S130, the units 33 to 37 perform an object excluding process for the forward objects. In this process, when the controlled vehicle can pass through on or over one forward object, the controlled vehicle should not be controlled on the basis of the forward object. Therefore, the forward object is specified as an unnecessary object, and the unnecessary object is excluded from the forward objects. For example, the controlled vehicle can pass through on or over an object such as a manhole present on the traffic lane of the road on which the controlled vehicle is running, a joint present on a bridge or the like without colliding with the object. Further, when the controlled vehicle can pass under one forward object, the controlled vehicle should not be controlled on the basis of the forward object. Therefore, the forward object is specified as an unnecessary object. For example, the controlled vehicle can pass under an object such as a signboard, a guideboard or the like fixedly put over the traffic lane of the road on which the controlled vehicle is running. Assuming that the controlled vehicle is controlled so as not to pass over or under the unnecessary object, the driver or passenger of the controlled vehicle feels uncomfortable. Therefore, in the object excluding process, all unnecessary objects are excluded from the forward objects detected in the object tracking process. This object excluding process will be described later in detail.

Thereafter, at step S140, the specifying unit 37 specifies each forward object, which is detected in the object tracking process but is not excluded in the object excluding process, as a control-based object, and information on each control-based object is stored in a memory such as RAM. Therefore, the object specifying process is ended. The information on each control-based object contains the speed and position of the control-based object relative to the controlled vehicle. Then, a probability that the controlled vehicle collides with each control-based object is calculated. When the control section 10 judges from the calculated probability that the controlled vehicle should be controlled on the basis of the control-based object, the control section 10 operates the actuators 30 to control the running of the controlled vehicle.

Figure 4:
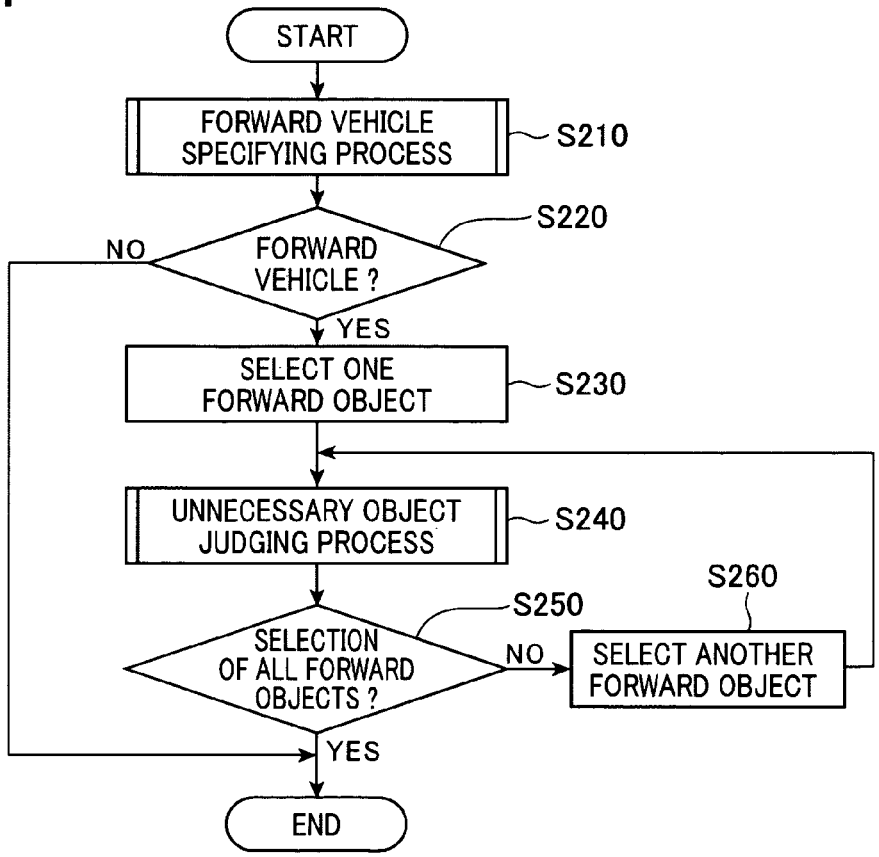
FIG. 4 is a flowchart showing an object excluding process in the object specifying process.

The object excluding process will be described in detail with reference to FIG. 4. FIG. 4 is a flowchart showing the object excluding process.

As shown in FIG. 4, at step S210, the forward vehicle specifying unit 33 of the control unit 10 performs a forward vehicle specifying process for each forward object to specify one of the forward objects as a forward vehicle. The forward vehicle is defined as a forward object running at a position placed in the forward direction of the controlled vehicle.

Figure 5:
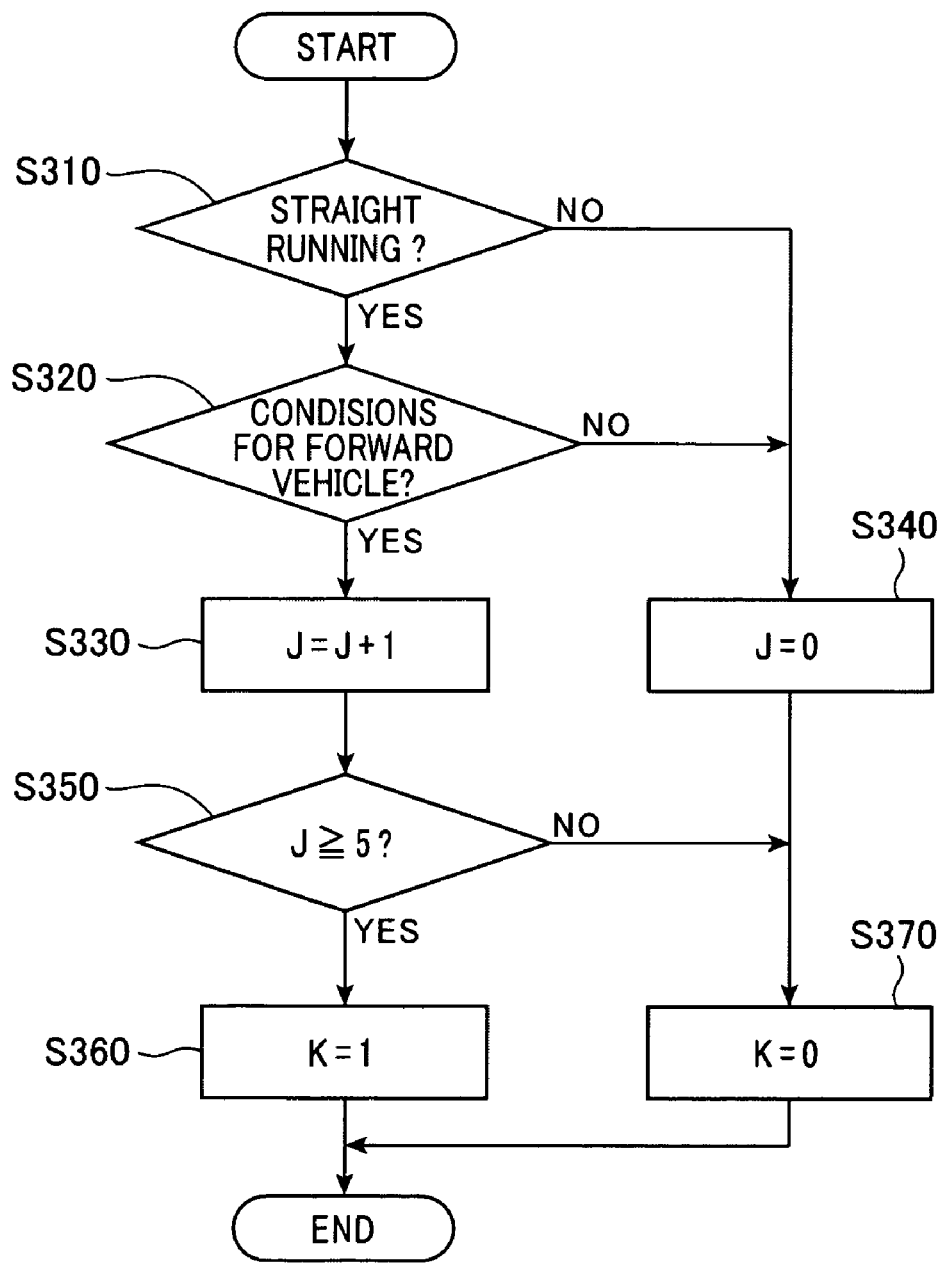
FIG. 5 is a flow chart showing a forward vehicle specifying process in the object excluding process.

The forward vehicle specifying process performed for one forward object will be described in detail with reference to FIG. 5. FIG. 5 is a flow chart showing the forward vehicle specifying process.

As shown in FIG. 5, at step S310, it is judged whether or not the controlled vehicle is running straight on the road. For example, the control section 10 estimates the curving radius of a curved road on which the controlled vehicle is running. The curving radius is estimated from either a steering wheel angle detected in a steering sensor (not shown) or the white line indicating the side of the running road. Information on this white line is obtained from the photographed picture of the camera 21. Then, the specifying unit 33 judges, from the speed of the controlled vehicle and the estimated radius of the running road, whether or not the controlled vehicle is running straight. For example, when the speed is equal to or higher than 20 km/hr while the estimated radius is equal to or larger than 1000 m, the specifying unit 33 judges that the controlled vehicle is now running straight.

When the controlled vehicle is not running straight (NO at step S310), at step S340, a count value J of a forward vehicle counter corresponding to the forward object is reset at zero. The value J of this counter denotes how many times the forward object is successively set as a candidate for a forward vehicle in a period of time including this present control period and preceding control periods. Therefore, the forward object is not set as a candidate for a forward vehicle. Then, at step S370, a forward vehicle specifying flag K corresponding to the forward object is set at 0 to be set in the off state. The flag K equal to 0 indicates that the corresponding forward object is not specified as a forward vehicle. Therefore, the forward object is not specified as a forward vehicle, and this forward vehicle specifying process is ended.

In contrast, when the controlled vehicle is running straight (YES at step S310), at step S320, it is judged whether or not the forward object satisfies the conditions necessary for a forward vehicle. When the forward object already specified as a control-based object in the preceding control period is moving on the same traffic lane as that of the controlled vehicle at a high probability in a predetermined range of the inter-vehicle distance, the forward object satisfies these forward vehicle conditions.

When the forward object does not satisfy the forward vehicle conditions (NO at step S320), at step S340, the value J of the forward vehicle counter corresponding to the forward object is reset at zero. Then, the flag K is set at 0 (step S370), and this forward vehicle specifying process is ended.

In contrast, when the forward object satisfies the forward vehicle conditions (YES at step S320), at step S330, the value J of the forward vehicle counter is incremented. Therefore, the forward object is set as a candidate for a forward vehicle. Then, at step S350, it is judged whether or not the value J of the forward vehicle counter is equal to or higher than 5.

In the case of an affirmative judgment at step S350, at step S360, the flag K corresponding to the forward object is set at 1 to be set in the on state. The flag K equal to 1 indicates that the forward object denotes a forward vehicle. Therefore, the forward object is specified as a forward vehicle. Then, this forward vehicle specifying process is ended.

In contrast, in the case of a negative judgment at step S350, at step S370, the flag K is set at 0. Therefore, the forward object is not specified as a forward vehicle. Then, this forward vehicle specifying process is ended.

After the forward vehicle specifying process, the procedure returns to the object excluding process. As shown in FIG. 4, at step S220, it is judged whether or not one of the forward objects is specified as a forward vehicle. When any of the flags K corresponding to the forward objects is set in the off state (i.e., K=0), none of the forward objects is specified as a forward vehicle (NO at step S220). Therefore, this object excluding process is ended.

In contrast, when the flag K corresponding to one forward object is set in the on state (i.e., K=1), the forward object is specified as a forward vehicle (YES at step S220). Therefore, at step S230, one of the other forward objects is selected. Then, at step S240, an unnecessary object judging process is performed for the selected forward object.

Figure 6:
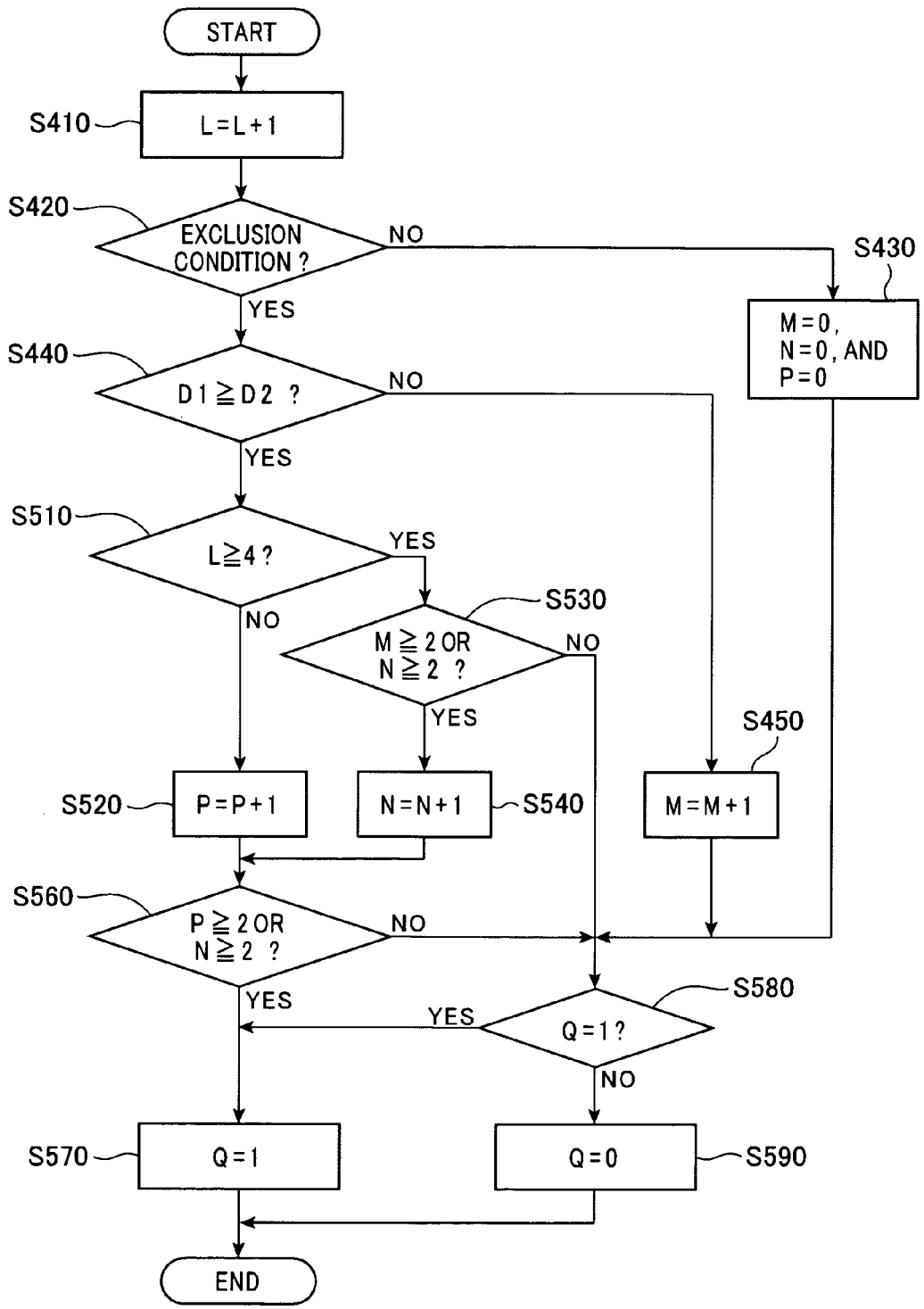
FIG. 6 is a flow chart showing the unnecessary object judging process in the object excluding process.

The unnecessary object judging process for one selected forward object will be described in detail with reference to FIG. 6. FIG. 6 is a flow chart showing the unnecessary object judging process.

In this process, when the controlled object should not be controlled on the basis of the selected forward object, the units 34 to 37 of the control section 10 specify the selected forward object as an unnecessary object to exclude the selected forward object specified as an unnecessary object from the forward objects by disregarding the information on the selected forward object. In contrast, when the controlled object should be controlled on the basis of the selected forward object, the selected forward object is specified as a control-based object to remain the selected forward object in the forward objects.

As shown in FIG. 6, at step S410, the value L of an object detecting counter corresponding to the selected forward object is incremented. The value L of this counter denotes how many times the selected forward object is successively detected as a forward object in a period of time including this present control period and preceding control periods. The value L equal to or higher than 2 indicates that the tracking unit 32 successfully tracks the selected forward object. Then, at step S420, the candidate specifying unit 36 judges whether or not the selected forward object satisfies an exclusion condition necessary for a candidate for exclusion.

When the selected forward object satisfies the exclusion condition, there is a probability that the selected forward object is an unnecessary object. In contrast, when the selected forward object does not satisfy the exclusion condition, the selected forward object is a control-based object. This exclusion condition is determined according to the position and movement of the selected forward object and/or the tracking state of the selected forward object. The exclusion condition contains a first condition that the value J of the forward vehicle counter corresponding to the forward vehicle is equal to or higher than one, a second condition that the value L of the object detecting counter corresponding to the selected forward object is equal to or higher than 2, a third condition that the selected forward object is in a stationary state (e.g., the speed of the selected forward object is equal to or lower than 2 km/hr), and a fourth condition that the selected forward object is placed on the same traffic lane as that of the controlled vehicle at a probability equal to or higher than 50%. Alternatively, the exclusion condition is a fifth condition that a lateral position of the selected forward object is spaced from a lateral position of the forward vehicle by a length shorter than a reference lateral length. The lateral position of a vehicle is defined as a position furthest from the center of the vehicle in the lateral direction perpendicular to the running direction of the vehicle on the running road. When these first to fourth conditions are satisfied or when the fifth condition is satisfied, the exclusion condition is satisfied.

The stationary state judging unit 34 judges whether or not the third condition is satisfied. When the third condition is satisfied, the judging unit 34 judges that the selected forward object is in a stationary state.

When the exclusion condition is not satisfied (NO at step S420), the unit 36 judges that the selected forward object is a control-based object. Therefore, at step S430, the candidate specifying unit 36 resets the value M of a signboard provisional counter corresponding to the selected forward object, the value N of a signboard counter corresponding to the selected forward object and the value P of an on-road object counter corresponding to the selected forward object at zero together. The value of each counter denotes how many times the unit 36 judges the selected forward object to be an unnecessary object such as a manhole or a signboard. Then, the procedure proceeds to step S580.

In contrast, when the exclusion condition is satisfied (YES at step S420), there is a probability that the selected forward object is an unnecessary object. Therefore, it is required to find out whether or not the selected forward object is an unnecessary object or a control-based object. That is, at step S440, the candidate specifying unit 36 judges whether or not the inter-vehicle distance D1 from the controlled vehicle to the forward vehicle is equal to or longer than the object distance D2 from the controlled vehicle to the selected forward object. That is, the unit 36 judges whether or not the selected forward object is placed in an inter-vehicle area between the controlled vehicle and the forward vehicle.

When the unit 36 judges that the inter-vehicle distance D1 to the forward vehicle is shorter than the object distance D2 to the selected forward object (NO at step S440), this judgment indicates that the selected forward object being in the stationary state is tracked by the tracking unit 32 before the forward vehicle passes through the selected forward object, so that there is a high probability that the selected forward object is an unnecessary object such as a signboard fixedly put over the road. Therefore, at step S450, the entry detecting unit 35 increments the value M of the signboard provisional counter. The value M of this counter indicates how many times the unit 35 judges, in a period of time including the present control period and preceding control periods, that there is a probability that the selected forward object is an object put over the road. Then, the procedure proceeds to step S580.

The entry detecting unit 35 repeatedly increments the value M of the signboard provisional counter until the selected forward object, placed on the same lane as that of the controlled vehicle and tracked by the tracking unit 32 before passing through the selected forward object, is placed in the inter-vehicle area. Therefore, in response to the affirmative judgment at step S440, the entry detecting unit 35 can immediately detect an entry of the selected forward object, placed out of the inter-vehicle area, into the inter-vehicle area.

In contrast, when the unit 36 judges that the inter-vehicle distance to the forward vehicle is equal to or longer than the distance to the selected forward object (YES at step S440), the candidate specifying unit 36 specifies the selected forward object as a candidate for a control-based object. That is, the unit 36 intends to find out whether the selected forward object placed in the inter-vehicle area is an unnecessary object placed on or over the road or cannot be specified as an unnecessary object placed on or over the road.

Therefore, at step S510, the object specifying unit 37 judges whether or not the value L of the object detecting counter is equal to or higher than 4. When the value L is lower than 4 (NO at step S510), the object specifying unit 37 judges that the object tracking unit 32 tracks the selected forward object for a tracking period of time shorter than a reference tracking period of time. That is, the unit 37 judges that the selected forward object, of which the view is obstructed by the forward vehicle, suddenly comes out from the lower position of the forward vehicle. This judgment means that, because the forward vehicle passes through on or over the selected forward object without colliding with the selected forward object, the collision probability of the controlled vehicle with the selected forward object is very low. Therefore, at step S520, the object specifying unit 37 increments the value P of the on-road object counter. The value P of this counter denotes how many times the unit 37 judges, in a period of time including the present control period and preceding control periods, that the selected forward object is an object such as a manhole located on the road. Then, the procedure proceeds to step S560.

In contrast, when the value L is equal to or higher than 4 (YES at step S510), the object specifying unit 37 judges that the object tracking unit 32 tracks the selected forward object for a tracking period of time equal to or longer than the reference tracking period of time. That is, the unit 37 judges that, because the selected forward object is tracked by the tracking unit 32 before the selected forward object is placed in the inter-vehicle area, the selected forward object is placed over the road or cannot be specified as an unnecessary object placed on or over the road. Therefore, to identify the selected forward object, at step S530, the entry detecting unit 35 judges whether or not the value M of the signboard provisional counter or the value N of the signboard counter is equal to or higher than 2. The value N of the signboard counter denotes how many times the entry detecting unit 35 judges, in a period of time including the present control period and preceding control periods, that the selected forward object is an object placed over the road without having any collision probability with the controlled vehicle.

When the value M and the value N are lower than 2 (NO at step S530), the entry detecting unit 35 judges that the selected forward object cannot be specified as an unnecessary object placed on or over the road. Therefore, the procedure proceeds to step S580. In contrast, when the value M or the value N is equal to or higher than 2 (YES at step S530), the entry detecting unit 35 judges that the selected forward object is probably placed over the road without having any collision probability with the controlled vehicle. Therefore, at step S540, the unit 35 increments the value N of the signboard counter.

After step S520 or step S540, at step S560, the object specifying unit 37 judges whether or not the value P of the on-road object counter is equal to or higher than 2, and the entry detecting unit 35 judges whether or not the value N of the signboard counter is equal to or higher than 2. When the value P is equal to or higher than 2 (YES at step S560), the object specifying unit 37 judges that the selected forward object is an unnecessary object such as a manhole present on the road in the inter-vehicle area without having any collision probability with the controlled vehicle. When the value N is equal to or higher than 2 (YES at step S560), the entry detecting unit 35 finally detects an entry of the selected forward object, placed out of the inter-vehicle area, into the inter-vehicle area. Therefore, the unit 35 judges that the selected forward object is an unnecessary object such as a signboard fixedly placed over the road in the inter-vehicle area without having any collision probability with the controlled vehicle.

Because of the judgment of the unit 35 and/or the unit 37 at step S560, at step S570, the unit 37 sets the value Q of an exclusion flag corresponding to the selected forward object at 1. The exclusion flag set at 1 denotes that the unit 37 specifies the selected forward object as an unnecessary object. The exclusion flag is initially set at 0 to be set in the off state. Then, this unnecessary object judging process is ended.

In contrast, when the value P and the value N are lower than 2 (NO at step S560), each of the entry detecting unit 35 and the object specifying unit 37 judges that the selected forward object cannot be reliably specified as an unnecessary object placed on or over the road. Therefore, the procedure proceeds to step S580.

At step S580, the object specifying unit 37 judges whether or not the value Q of the exclusion flag is equal to one. When the value Q is changed to 1 (YES at step S580), at step S570, the unit 37 maintains the value Q. Then, this unnecessary object judging process is ended. Therefore, after the object specifying unit 37 specifies the selected forward object as an unnecessary object at step S570, the unit 37 keeps the specification of the selected forward object as the unnecessary object (step S580 and step S570).

In contrast, when the value Q is maintained to 0 (NO at step S580), at step S590, the unit 37 still sets the value Q of the exclusion flag at zero. The exclusion flag set at zero denotes that the unit 37 specifies the selected forward object as a control-based object. Then, this unnecessary object judging process is ended.

After the unnecessary object judging process, the procedure returns to the object excluding process. As shown in FIG. 4, at step S250, the object specifying unit 37 judges whether or not all the other forward objects have been selected. When one of the other forward objects is not selected (NO at step S250), at step S260, the forward object is selected. Then, at step S240, the unnecessary object judging process is again performed for the selected forward object. In contrast, when all the other forward objects have been selected (YES at step S250), this object excluding process is ended. Then, the procedure returns to the object specifying process.

In the object specifying process, as shown in FIG. 3, at step S140, when the value Q of the exclusion flag corresponding to one forward object is equal to 0, the object specifying unit 37 specifies the forward object as a control-based object, and information on the control-based object is stored in a memory such as RAM. In contrast, when the value Q of the exclusion flag corresponding to one forward object is equal to one, the object specifying unit 37 judges that the controlled vehicle should not be controlled on the basis of the forward object. Therefore, the object specifying unit 37 specifies the forward object as an unnecessary object, and the control section 10 disregards the information on the forward object.

As described above, in this control system 1, when the tracking unit 32 tracks the candidate for a control-based object for a tracking period of time equal to or longer than the reference tracking period, the object specifying unit 37 judges that there is a probability that the controlled vehicle will collide with the candidate and specifies the candidate as a control-based object. The controlled vehicle is controlled according to the movement of the control-based object tracked by the tracking unit 32. In contrast, when the tracking unit 32 tracks the candidate for a control-based object for a tracking period of time shorter than the reference tracking period, the object specifying unit 37 judged that the candidate, of which the view is obstructed by the forward vehicle, suddenly comes out from the lower position of the forward vehicle. Therefore, the object specifying unit 37 judged that there is no possibility that the controlled vehicle collides with the candidate and specifies the candidate as an unnecessary object. The controlled vehicle is controlled regardless of the movement of the unnecessary object.

Accordingly, the control system 1 can reliably specify any object such as a manhole, of which the view is obstructed by the forward vehicle and which should not be specified as a control-based object, as an unnecessary object so as not to control the controlled vehicle on the basis of the unnecessary object. That is, although the control system 1 controls the controlled vehicle on the basis of a group of control-based objects, any object which should not be considered for the control of the controlled vehicle can be excluded from the group of control-based objects, and the computing load of the control system 1 required to avoid the collision of the controlled vehicle with an object or to automatically drive the controlled vehicle can be reduced.

Further, when the control system 1 once specifies one forward object as an unnecessary object, the control system 1 keeps this specification. Accordingly, even when the tracking unit 32 tracks the forward object such as a manhole for a tracking period of time equal to or longer than the reference tracking period, the control system 1 can reliably exclude the forward object from the group of control-based objects.

Moreover, on condition that the stationary state judging unit 34 judges one forward object such as a manhole to be in a stationary state, the candidate specifying unit 36 specifies the forward object as a candidate for a control-based object. Accordingly, the control system 1 can exclude only the forward object to be in a stationary state from the group of control-based objects.

Furthermore, when the forward object is placed on the same lane as that of the controlled vehicle (YES at step S420), the entry detecting unit 35 detects the entry of one forward object, placed out of the inter-vehicle area, into the inter-vehicle area (N≧2 at step S560), the object specifying unit 37 specifies the forward object as an unnecessary object even when the object tracking unit 32 tracks the forward object for a tracking period of time equal to or longer than the reference tracking period of time. For example, when the forward vehicle passes through under an object such as a signboard fixedly put over a traffic lane of the road on which the controlled vehicle is running, the object entries the inter-vehicle area between the controlled vehicle and the forward vehicle. In this case, because the forward vehicle passes through under the object without colliding with the object, the control system 1 judges that the controlled vehicle can safely pass under the object without colliding with the object. Therefore, the control system 1 can exclude any object such as a signboard from the group of control-based objects. Accordingly, the control system 1 can reliably specifies an object, which is put over the road so as not to collide with any vehicle, as an unnecessary object, and can precisely specify an object, having a probability of collision with the controlled vehicle, as a control-based object.

In this embodiment, each of the values L, M, N and P of the counters is incremented in response to the affirmative judgment in the unnecessary object judging process. However, even when no affirmative judgment is obtained, the value of each counter is sometimes incremented due to a noise or the like. Assuming that one forward object is judged, in response to the counter value equal to or higher than 1, to be an unnecessary object, the noise sometimes influences this judgment. To reliably prevent the noise from influencing the judgment, in this embodiment, it is required at step S420, S530, or S560 that a judgment is formed when each of the counter values L, M, N and P is equal to or higher than 2. Therefore, when the counter value is successively incremented twice or more, an affirmative judgment is obtained.

The counter value required for a judgment in the unnecessary object judging process may be arbitrarily set. Further, the counter value required for a judgment in the forward vehicle specifying process may be arbitrarily set. Moreover, to judge whether or not one forward object is in a stationary state, the control system 1 may judge from the result of the tracking performed for the forward object.

The embodiment should not be construed as limiting the present invention to structures of those embodiments, and the structure of this invention may be combined with that based on the prior art. For example, the conditions necessary for the forward vehicle or the exclusion condition necessary for a candidate for exclusion can be arbitrarily set. The forward vehicle specifying unit 33 may specify one of the forward objects as a forward vehicle when the forward object has a shape similar to the general shape of a vehicle and/or has tail lights. Further, the counter value for the judgment can be appropriately set so as to depend on the control period.

What is claimed is:
1. An object specifying device for specifying a control-based object, according to a movement of which a controlled vehicle is controlled, comprising:
   detection result acquisition unit for acquiring a detection result from an object detector, the detection result including at least a position of each of a plurality of objects existing in a monitoring area set along a running direction of the controlled vehicle;

an object tracking unit that tracks each of the plurality of objects as a forward object to detect a movement of the object on the basis of its current and previous acquired positions relative to the controlled vehicle;

a forward vehicle specifying unit that specifies one of the forward objects as a forward vehicle when the forward object is moving;

a candidate specifying unit that specifies each of the forward objects other than the forward vehicle as a candidate for the control-based object when the forward object is placed in an inter-vehicle area between the controlled vehicle and the forward vehicle; and an object specifying unit that specifies one of the candidates specified by the candidate specifying unit as the control-based object when the object tracking unit tracks the candidate for a tracking period of time equal to or longer than a reference tracking period of time and specifies another one of the candidates as a non-control-based object when the object tracking unit tracks the candidate for a tracking period of time shorter than the reference tracking period of time.

2. The device according to claim 1, wherein the object specifying unit keeps the specification as the non-control-based object after the object specifying unit specifies the candidate as the non-control-based object.

3. The device according to claim 1, further comprising
a stationary state judging unit that judges, from a relative speed of each forward object, whether or not the forward object is in a stationary state, the relative speed being derived from a traveling speed of the controlled vehicle and the movement of the forward object obtained by the object tracking unit tracking the forward object, wherein the candidate specifying unit specifies the forward object that is judged by the stationary state judging unit not to be in the stationary state, as the candidate for the control-based object, even when the object tracking unit tracks the forward object for a tracking period of time shorter than the reference tracking period of time.

4. The device according to one of claim 1, further comprising
an entry detecting unit that detects an entry of one forward object, placed on a running lane of the controlled vehicle and placed out of the inter-vehicle area, into the inter-vehicle area by sequentially, in time, comparing a distance from the controlled vehicle to the forward vehicle and a distance from the controlled vehicle to the forward object each time the movement of the forward object is obtained by the object tracking unit tracking the forward object, wherein the object specifying unit specifies the forward object, which is specified as the candidate by the candidate specifying unit and is detected by the entry detecting unit to have entered the inter-vehicle area, as the non-control-based object even when the object tracking unit tracks the forward object for a tracking period of time equal to or longer than the reference tracking period of time.

5. An object specifying device for specifying a control-based object, according to a movement of which a controlled vehicle is controlled, comprising:

detection result acquisition means for acquiring a detection result from an object detector, the detection result including at least a position of each of a plurality of objects existing in a monitoring area set along a running direction of the controlled vehicle;

an object tracking unit that tracks each of the plurality of objects as a forward object to detect a movement of the object on the basis of its current and previous acquired positions relative to the controlled vehicle;

a forward vehicle specifying unit that specifies one of the forward objects as a forward vehicle when the forward object is moving;

a candidate specifying unit that specifies each of the forward objects other than the forward vehicle as a candidate for the control-based object when the forward object is placed in an inter-vehicle area between the controlled vehicle and the forward vehicle; and an object specifying unit that specifies one of the candidates specified by the candidate specifying unit as the control-based object when the object tracking unit tracks the candidate for a tracking period of time equal to or longer than a reference tracking period of time and specifies another one of the candidates as a non-control-based object when the object tracking unit tracks the candidate for a tracking period of time shorter than the reference tracking period of time; and a vehicle control unit that controls the controlled vehicle according to a movement of the control-based object specified by the object specifying device.

* * * * *